Jan. 1, 1929.
E. M. CLAYTOR
1,697,163
MOTOR CONTROL SYSTEM
Filed Feb. 18, 1924
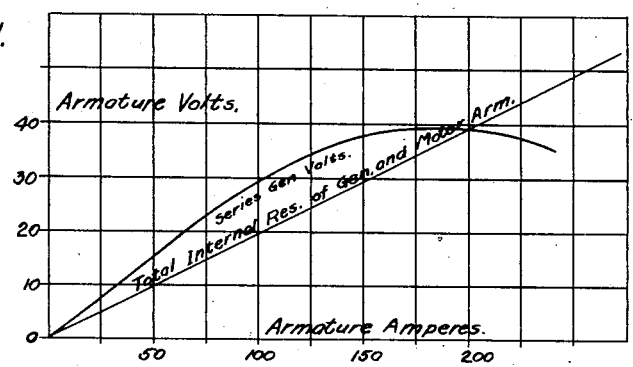
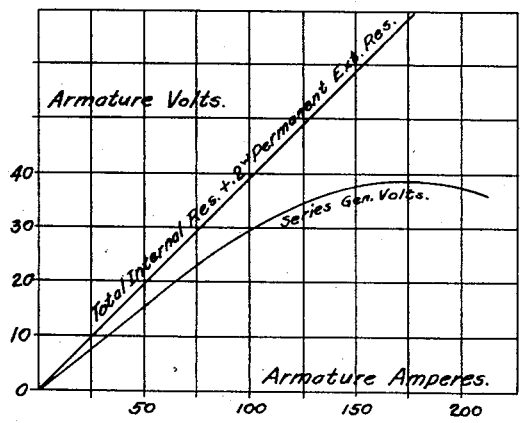
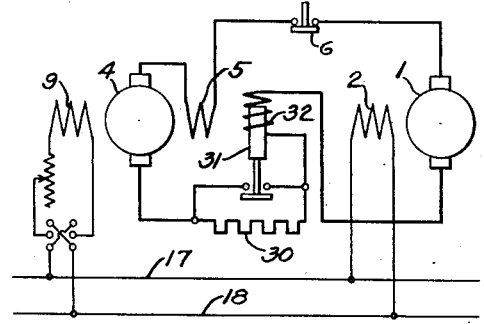
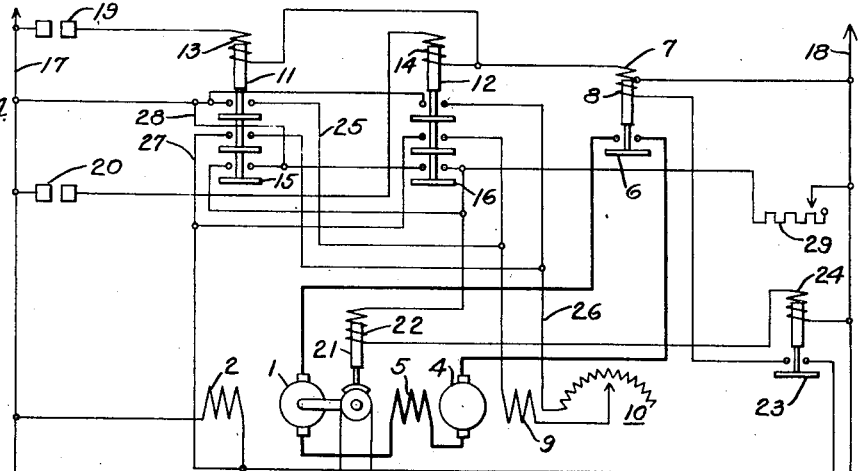
WITNESSES:
INVENTOR
Edward M. Claytor.
BY
ATTORNEY Patented Jan. 1, 1929.

1,697,163

UNITED STATES PATENT OFFICE.

EDWARD M. CLAYTOR, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed February 18, 1924. Serial No. 693,563.

My invention relates to systems of motor control and it has particular relation to such systems as are employed in connection with elevators, planers and similar machines.

An object of my invention is to provide a simple and effective system of variable voltage control for direct current motors.

Another object of my invention is to provide a variable voltage system of motor control that avoids the danger of creepage of the motor, occasioned by residual generator voltage applied thereto.

My invention will be described in connection with the accompanying drawing, in which Figs. 1 and 2 represent characteristic curves of a generator employed in connection with my system.

Fig. 3 is a diagrammatic view of main circuits and connections embodying one form of my invention, and Fig. 4 is a diagrammatic representation of circuits and apparatus embodying my invention in preferred form.

Referring particularly to Fig. 4, a motor having an armature 1 and a separately excited field-magnet winding 2 is operatively connected in a customary manner for controlling an elevator car 3. A compound-wound generator for supplying energy to the motor is provided with an armature 4 and a series field-magnet winding 5, for connection in circuit with the motor armature 1, said circuit connection being controlled by means of a switch 6 having an operating coil 7 and a holding coil 8. The generator is also provided with a separately excited field-magnet winding 9, the excitation of which may be regulated by means of a rheostat 10. Reversing switches 11 and 12, having operating coils 13 and 14 respectively, are connected for controlling the generator field winding 9, and auxiliary contact members 15 and 16 are respectively connected to, and actuated by, switches 11 and 12.

A separate source of energy is provided for exciting the generator and the motor comprising conductors 17 and 18, from which energy is directed through a master switch of any suitable form comprising forward and reverse contact members 19 and 20 respectively. An electromagnetic brake 21, having an operating coil 22, is provided for the elevator. An auxiliary relay 23 is connected in circuit with the holding coil 8 of switch 6 and the relay operating coil 24 is connected in series relation with the brake coil 22.

When master switch contact members 19 are closed, operating coils 13 and 7 of switches 11 and 6, respectively, are energized from conductors 17 and 18. The closure of switch 6 completes a "loop circuit" comprising motor armature 1, generator armature 4 and series field-magnet winding 5. The closure of switch 11 completes a circuit for the generator field magnet winding 9 extending from supply conductor 17, through switch 11, conductor 25, winding 9, rheostat 10, conductor 26, switch 11 and conductor 27 to supply conductor 18.

The generator armature 4 which is normally driven at constant speed by any suitable prime mover (not shown), now supplies energy to motor armature 1 for operating the elevator. Simultaneously with the energization of generator field winding 9, the brake-magnet winding 22 is also energized, the operating circuit therefor extending from conductor 17 through conductor 28, auxiliary contact member 15, and coils 22 and 24 to conductor 18. Therefore, brake 21 is released during the normal operation of the elevator, in the customary manner. Relay 23 also closes to establish a holding circuit for switch 6 extending from conductor 18 through coil 8 and relay 23 to conductor 17. The purpose of this holding circuit will later become apparent. The speed of the elevator is regulated in a well-known manner by means of generator field-rheostat 10.

It is known that in the case of a compound-wound generator, when the separately excited field winding is opened, there remains a certain amount of residual magnetism, whereby the generator tends to build up as a series machine supplying its own excitation through the series field winding. If, during such period, the loop circuit, comprising the motor and generator armatures, is not interrupted, sufficient current will flow to cause the motor armature to creep. To avoid this difficulty, I interrupt the loop circuit through switch 6. When master switch contact members 19 are opened to de-energize generator field winding 9 and stop the elevator, the de-energization of coil 13 effects the opening of contact member 15, interrupting the previously-traced circuit of the brake coil 22, whereupon brake 21 sets. I have found that, in order to prevent a too sudden stopping of the motor 1, it is preferable to maintain switch 6 closed until armature 1 is substantially at rest and the brake 21 has set. According to my system, the counter E. M. F. from brake coil 22 discharges through a closed circuit comprising relay coil 24 and an adjustable resistor 29, when contact member 15 opens to interrupt the current supply from conductors 17 and 18. This counter E. M. F. is sufficient to maintain relay 24 closed an appreciable period of time that may be adjusted by means of resistor 29. Hence, relay 24 remains closed until the brake coil is completely inoperative. By this means the holding coil 8 of switch 6 is maintained energized for a desired period and prevents the simultaneous setting of brake 21 and the interruption of the loop circuit of the armatures 1 and 4. Since switch 6 finally opens to interrupt the main loop circuit, the previously mentioned circulating current caused by residual generator-voltage ceases to flow.

Similar operation of the motor armature 1 is effected in the reverse direction upon the closure of master switch contact members 20, to energize coil 14 of switch 12 and to again effect the closure of switch 6. A circuit therefor extends from conductor 17 through contact members 20, and coils 14 and 7 to conductor 18. The closure of contact member 16 of switch 12 completes a circuit for the brake coil 22 and relay coil 24, this circuit extending from conductor 17 through conductor 28, contact member 16, and coils 22 and 24 to conductor 18. The operation of the elevator in this direction corresponds otherwise to the operation previously described.

As another method of avoiding the danger of creepage I have connected armatures 1 and 4 in circuit with a resistor 30 as illustrated in Fig. 3 of the drawing. During normal operation, resistor 30 is shunted by switch 31 and current flows from generator armature 4 through field-magnet winding 5, motor armature 1, switch coil 32 and switch 31 to armature 4. When, however, the separately excited winding 9 is deenergized to stop the motor, the current traversing armatures 1 and 4 and switch coil 32 is reduced to such value that switch 31 opens and inserts resistor 30 in the armature circuit. Insertion of resistor 30 reduces the amount of the circulating current through armatures 1 and 4 to a value that is ineffectual to cause creepage.

The effect of such resistance will become apparent from inspection of Figs. 1 and 2. From Fig. 1, it will be seen that the internal resistance of the generator and motor armatures is of such low value that residual generator voltage of any appreciable value will cause a certain amount of current to circulate. However, if sufficient external resistance is inserted in circuit with armatures 1 and 4, the resistance line is raised so that at no point does it intersect the characteristic curve corresponding to series generator voltage, as indicated in Fig. 2. In this manner, I also avoid the danger of creepage and it becomes unnecessary to interrupt the loop circuit, that is to say, switch 6 may be maintained closed, except in case of emergency.

It will be recognized from the foregoing description of my invention that I have devised a system for avoiding the danger of creepage of a motor armature when employing variable voltage or a Ward Leonard system of connections. I also prevent too sudden stopping of the motor armature, which would otherwise cause discomfort to passengers or produce unnecessary strain on the apparatus.

I have described and illustrated my invention in preferred form, but modifications thereof may occur to those skilled in the art and I desire to be limited only in accordance with the scope of the appended claims.

I claim as my invention:

1. The combination with a direct-current motor and a compound-wound generator for supplying current thereto of a switch for connecting the machine armatures in series relation, an electromagnetic brake, and means responsive to the counter E. M. F. of the brake coil for preventing the opening of said switch until said brake sets.

2. The combination with a direct-current motor and a compound-wound generator for supplying current thereto, of a switch for connecting the machine armatures in series relation, an electromagnetic brake, and electroresponsive means for preventing the opening of said switch until said brake sets.

3. The combination with a direct-current motor and a separately excited generator for supplying current thereto, of means for connecting the machine armatures in series relation, an electromagnetic brake for said motor, means for simultaneously exciting said generator and energizing said electromagnetic brake, and means for preventing the operation of said first named means to disconnect said machine armatures until after the operation of said last named means to deenergize said electromagnetic brake.

4. The combination with a direct-current motor and a generator for supplying current thereto, said generator having a separately excited field winding, of a switch for connecting the armatures of said machines in series relation, an electromagnetic brake for said motor, a switch for causing the simultaneous energization of said generator field winding and said electromagnetic brake, and means operative after the opening of said last named switch for delaying the opening of said first named switch.

5. The combination with a direct-current motor and a generator for supplying current thereto, said generator having a field winding, of an electromagnetic brake for said motor, means for connecting the armatures of said motor and said generator in series relation, means for connecting said field winding to a source of energy, means for connecting said electromagnetic brake to a source of energy, a switch for causing the simultaneous operation of said three last named means, and electroresponsive means for preventing the reverse operation of said first named means for a period after the reverse operation of said second named means.

6. In a motor control system, a motor, a compound-wound generator, a circuit connecting the armature and series field winding of said generator in series relation with the armature of said motor, a normally applied brake for said motor, means for releasing said brake, means for controlling the generator voltage to run said motor and controlling said brake releasing means, and means operable only when said brake releasing means is rendered inoperative for opening said armature circuit.

7. In a motor control system, a motor, a compound-wound generator for supplying current to said motor, a circuit connecting the armature and series field winding of said generator in series relation with the armature of said motor, a normally applied brake for said motor, means for releasing said brake and for controlling the generator voltage to run said motor and means automatically operable when said brake releasing means is inoperative for opening said armature circuit.

8. In a motor control system, a motor, a compound wound generator for supplying current to said motor, a circuit connecting the armature and series field winding of said generator in series relation with the armature of said motor, a normally applied brake for said motor, means for releasing said brake and for controlling the generator voltage to run said motor and means automatically operable when said brake releasing means is inoperative for opening said armature circuit at a predetermined time thereafter.

9. In a motor control system, a motor, a compound-wound generator for supplying voltage to said motor, a circuit connecting the armature and series field winding of said generator in series relation with the armature of said motor, a normally open switch in said circuit, a normally applied brake for said motor, electromagnetic means for releasing said brake, a discharge circuit for said brake releasing means, means for controlling the generator voltage and for supplying current to said brake releasing means to run said motor and means operable by the discharge current from said brake releasing means for maintaining said switch closed for a predetermined time after current is cut off from said brake releasing means.

10. In a motor control system, a motor, a compound-wound generator for supplying voltage to said motor, a circuit connecting the armature and series field winding of said generator in series relation with the armature of said motor, a normally open switch in said circuit, a normally applied brake for said motor, electromagnetic means for releasing said brake, a discharge circuit for said brake releasing means, means for actuating said switch for controlling the generator voltage and for supplying current to said brake releasing means to run said motor, and means in said discharge circuit for maintaining said switch closed until said brake releasing means is discharged and said brake is applied.

In testimony whereof, I have hereunto subscribed my name this 4th day of February, 1924.

EDWARD M. CLAYTOR.